Oct. 7, 1952   D. N. BERRY   2,613,020
BOAT CARRIER FOR AUTOMOBILES
Filed June 9, 1950   2 SHEETS—SHEET 1
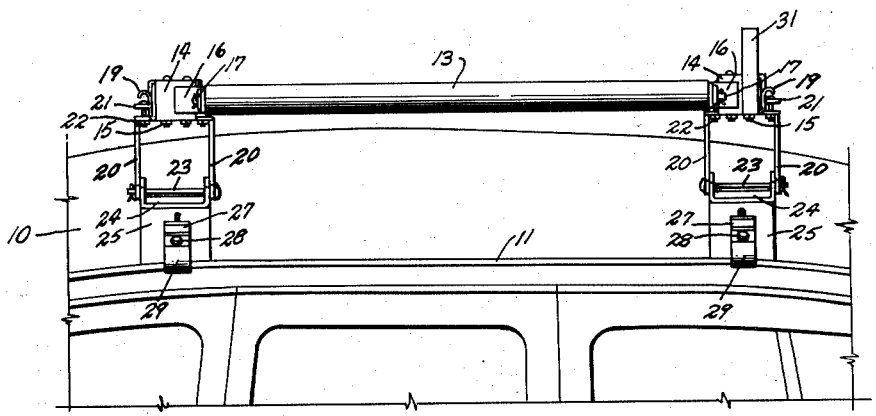
Fig. 1.
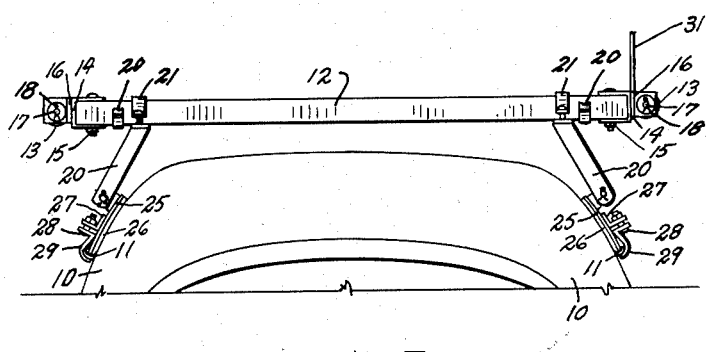
Fig. 2.
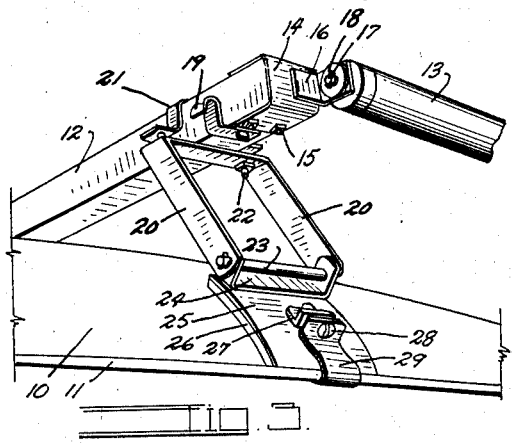
Fig. 3.
INVENTOR.
DONALD N. BERRY
BY
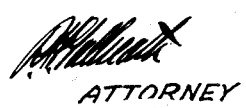
ATTORNEY Oct. 7, 1952 D. N. BERRY 2,613,020
BOAT CARRIER FOR AUTOMOBILES
Filed June 9, 1950 2 SHEETS—SHEET 2
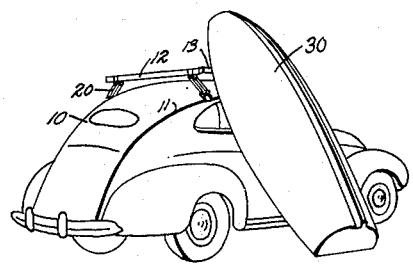
Fig. 4
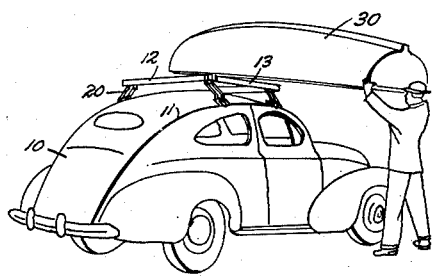
Fig. 5
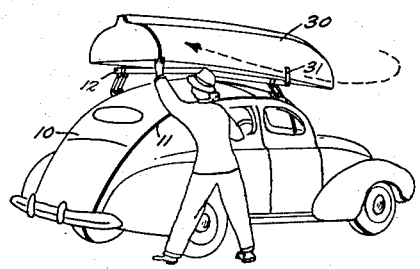
Fig. 6
INVENTOR.
DONALD N. BERRY
BY
ATTORNEY Patented Oct. 7, 1952

2,613,020

UNITED STATES PATENT OFFICE 2,613,020

BOAT CARRIER FOR AUTOMOBILES

Donald N. Berry, Denver, Colo.

Application June 9, 1950, Serial No. 167,180

4 Claims. (Cl. 224—42.1)

This invention relates to a boat-carrying attachment for automobiles, and has for its principal object the provision of an attachment which can be quickly and easily applied to any conventional closed-type automobile, and which will safely and securely transport a boat above the top of the automobile.

Another object of the invention is to provide a boat-carrying attachment for automobiles so arranged that one person can quickly and easily place the boat in place on the attachment, or remove it therefrom, without being required to lift the entire weight of the boat, and without marring or damaging either the boat or the automobile.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved boat-carrying attachment, illustrating it in place on an automobile;

Fig. 2 is a rear view thereof;

Fig. 3 is a fragmentary, perspective view illustrating the means of attaching the attachment to the automobile; and Figs. 4, 5, and 6 are perspective views illustrating the steps employed in placing a boat on the attachment.

In the drawings a typical automobile is indicated at 10, with its rain gutter at 11, and a conventional boat is illustrated at 30.

The improved boat-carrying attachment consists of two, preferably wooden, cross beams 12 which are held in spaced relation by means of a side roller 13. A U-shaped end strap 14 is bolted by means of suitable bolts 15 over one extremity of each cross beam 12. An angle clip 16 is welded or otherwise formed on each end of strap 14. The angle clips 16 serve as bearings for axle studs 17 projecting from the opposite extremities of the roller 13. The axle studs 17 are secured in the clips 16 by means of removable cotter keys 18. A tying hook 19 is secured on each cross beam 12 adjacent each extremity thereof.

The beams 12 are supported above the roof of the automobile 10 in transverse, parallel relation by means of inverted U-shaped, inclined bracket members 20 the horizontal portions of which are clamped to the beams 12 by means of clamp straps 21 and clamp bolts 22. The bracket members 20 on each beam 12 extend oppositely outward at an angle of substantially 30° from the vertical, as shown in Fig. 2.

The lower extremities of the brackets 20 terminate on hinge pins 23 which are supported in U-shaped clips 24. The clips 24 are welded or otherwise mounted on curved, metallic pad members 25 having a contour to approximate the average contour of the top of the automobile 10. The pad members 25 carry cushions 26 cemented or otherwise secured thereto to prevent marring of the finish of the automobile.

An angle clip 27 is welded or otherwise secured on each pad member to receive a clamp screw 28. The clamp screws 28 pass through upturned extremities on attachment hook members 29 which are curved to engage the rain gutter 11 of the automobile. The screws 28 serve to clamp the lower edges of the pad members down into and against the rain gutters 11. The angle clip 16 on the forward right side of the carrier is extended upwardly to provide a fulcrum post 31, the use of which will be later described.

It is desired to call attention to the universal adjustment provided by the above structure. To initially adjust the carrier to a given automobile, the clamp straps 21 are loosened and the pad members are clamped to the rain gutter by means of the screws. This automatically moves the straps along the beams 12 to the proper position for the width of the given automobile. The straps are then tightened by means of the bolts 22 and need not be again adjusted for the same automobile. The curvature of the top is automatically accommodated by the pivotal action on the hinge pins 23.

The boat 30 is carried in an upside-down position on the two wooden cross beams 12 and is tied thereto by means of suitable straps or ropes (not shown) which engage the tying hooks 19.

To place a boat on the carrier, it is inverted and tilted, bow upwardly, against the roller 13, as shown in Fig. 4. The stern of the boat is then elevated and the entire boat is pushed forwardly on the supporting roller, as shown in Fig. 5.

When approximately the middle of the boat is reached, the stern is swung rearwardly on the supporting roller, causing the forward side of the boat to swing against the fulcrum post 31 as the stern of the boat is swung rearwardly, as shown in Fig. 6. After the boat is in the position of Fig. 6, it is secured by straps or ropes tied under the hooks 19.

To remove the boat, the above procedure is simply reversed, and the fulcrum post 31 serves as a fixed point against which the side of the boat may be pried to swing it from the longitudinal position of Fig. 6 to the transverse position of Fig. 5, from whence it may be lowered to the inclined position of Fig. 4.

When the carrier is not in use, the cotter keys 18 may be withdrawn, and the roller 13 removed and tied in aligned relation with the two beams 12 for convenient transportation or storage.

In the conventional automobile the rain gutters 11 curve downwardly fore and aft. It has been found that the average incline of the gutters at the positions at which the carrier attaches is 5° from horizontal. In view of this, the lower edges of the pad members 25 are cut on an incline of substantially 5° so that when these edges are resting in the gutters, the pad members will be substantially vertical. However, the axle studs 17 fit loosely in the clips 16 and the tops of the beams are preferably rounded so that a slight incline in either direction is not critical to the efficiency of the carrier.

In the usual automobile top carrier, the weight is supported upon the top of the automobile. The tops are of relatively thin, bowed sheet metal and the weight they will support is very limited. In this improved carrier, however, the principal weight is transmitted to the rain gutter and the remainder is frictionally supported by the pad members and their cushions on the sides of the rounded and supported dome section of the automobile top. This allows the improved carrier to support a greater load than the top will support. The angular position of the brackets 20 act to effectively resist sidesway of the carrier.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A boat carrier for automobiles of the type having a rain gutter, comprising: two cross beams; a bracket member beneath each extremity of each cross beam; clamping straps securing said bracket members to said cross beams, each bracket member extending outwardly and downwardly from its clamping strap beneath an extremity of the cross beam; a pad member below the lower extremity of each angle bracket; hinge means pivoting each pad member to the adjacent angle bracket; an angle clip extending upwardly from each pad member; a clamp screw extending through each angle clip; and a hook member mounted on each clamp screw and adapted to engage said rain gutter, said brackets being longitudinally adjustable along said cross beams to accommodate automobiles of various widths.

2. A boat carrier for automobiles of the type having a rain gutter, comprising: two cross beams; a bracket member beneath each extremity of each cross beam; clamping straps securing said bracket members to said cross beams, each bracket member extending outwardly and downwardly from its clamping strap beneath an extremity of the cross beam; a pad member below the lower extremity of each angle bracket; hinge means pivoting each pad member to the adjacent angle bracket; an angle clip extending upwardly from each pad member; a clamp screw extending through each angle clip; a hook member mounted on each clamp screw and adapted to engage said rain gutter, said brackets being longitudinally adjustable along said cross beams to accommodate automobiles of various widths; and a roller rotatably mounted at its extremities at one extremity of each of said beams.

3. A boat carrier for automobiles of the type having a rain gutter, comprising: two cross beams; a bracket member beneath each extremity of each cross beam; clamping straps securing said bracket members to said cross beams, each bracket member extending outwardly and downwardly from its clamping strap beneath an extremity of the cross beam; a pad member below the lower extremity of each angle bracket; hinge means pivoting each pad member to the adjacent angle bracket; an angle clip extending upwardly from each pad member; a clamp screw extending through each angle clip; a hook member mounted on each clamp screw and adapted to engage said rain gutter, said brackets being longitudinally adjustable along said cross beams to accommodate automobiles of various widths; an end strap secured around one extremity of each of said cross beams; a bearing clip mounted on each of said end straps; a roller extending between said bearing clips and maintaining said cross beams in spaced relation; and a fulcrum post extending upwardly from one of the bearing clips above the plane of said carrier against which a boat may be pried from a longitudinal to a transverse position.

4. A boat carrier for automobiles as described in claim 1, having a fixed fulcrum post extending vertically upward from one extremity of one of said cross beams against which the boat may be pried to swing it from a transverse position relative to said beams to a parallel position therebetween.

DONALD N. BERRY.

REFERENCES CITED

The following references are of record in the file of this patent:

UNITED STATES PATENTS

| Number | Name | Date |
| --- | --- | --- |
| 2,357,203 | Jimmes | Aug. 29, 1944 |
| 2,446,092 | Lait | July 27, 1948 |
| 2,469,945 | Brei | May 10, 1949 |
| 2,469,987 | Pilsner | May 10, 1949 |

FOREIGN PATENTS

| Number | Country | Date |
| --- | --- | --- |
| 106,532 | Sweden | Dec. 6, 1940 |
| 216,092 | Switzerland | Nov. 17, 1941 |